US012584779B2

(12) United States Patent　　(10) Patent No.:　US 12,584,779 B2

Ohlsson et al.　　(45) Date of Patent:　Mar. 24, 2026

---

(54) RADAR LEVEL GAUGE SYSTEM PROPAGATING MULTIPLE INDIVIDUALLY GENERATED TRANSMIT SIGNALS BY A COMMON ANTENNA

(71) Applicant: Rosemount Tank Radar AB, Mölnlycke (SE)

(72) Inventors: Magnus Ohlsson, Norsholm (SE); Håkan Fredriksson, Linköping (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 356 days.

(21) Appl. No.: 18/494,094

(22) Filed: Oct. 25, 2023

(65) Prior Publication Data

US 2024/0175738 A1　　May 30, 2024

(30) Foreign Application Priority Data

Nov. 24, 2022　(EP) ..................................... 22209415

(51) Int. Cl.
　*G01F 23/284*　　(2006.01)
　*G01F 23/80*　　(2022.01)
　*H01Q 1/22*　　(2006.01)
(52) U.S. Cl.
　CPC ............ *G01F 23/284* (2013.01); *G01F 23/80* (2022.01); *H01Q 1/225* (2013.01)
(58) Field of Classification Search
　CPC ........ G01F 23/284; G01F 23/80; H01Q 1/225
　See application file for complete search history.

(56) References Cited

U.S. PATENT DOCUMENTS

| | | | |
|---|---|---|---|
| 6,414,625 B1 | 7/2002 | Kleman | |
| 7,671,700 B1* | 3/2010 | Rosenberg | .............. F16F 7/104 |
| | | | 333/113 |
| 2002/0135508 A1 | 9/2002 | Kleman | |
| 2004/0212529 A1 | 10/2004 | Fehrenbach et al. | |
| 2012/0137768 A1* | 6/2012 | Edvardsson | .......... G01F 23/284 |
| | | | 73/290 V |
| 2013/0009803 A1* | 1/2013 | Edvardsson | ........... H01Q 1/225 |
| | | | 342/124 |

(Continued)

FOREIGN PATENT DOCUMENTS

| | | |
|---|---|---|
| CN | 208536979 U | 2/2019 |
| WO | 03025523 A1 | 3/2003 |

OTHER PUBLICATIONS

Communication—Extended European Search Report from European Patent Application No. 22209415.3, dated May 4, 2023.

*Primary Examiner* — William Kelleher
*Assistant Examiner* — Noah Yi Min Zhu
(74) *Attorney, Agent, or Firm* — Westman, Champlin & Koehler, P.A.

(57)　　ABSTRACT

A radar level gauge system comprising a first microwave unit including a transmitter patch for transmitting a first transmit signal, a receiver patch for receiving a first reflection signal, and processing circuitry for determining a first level measurement; a second microwave unit including a transmitter patch for transmitting a second transmit signal, a receiver patch for receiving a second reflection signal, and processing circuitry for determining a second level measurement; an antenna; and a signal coupling arrangement including a first hollow waveguide directional coupler, a second hollow waveguide directional coupler, and a signal combiner.

14 Claims, 6 Drawing Sheets

2 pt

(56) References Cited

U.S. PATENT DOCUMENTS

| | | | |
|---|---|---|---|
| 2015/0268084 A1* | 9/2015 | Southern | B64C 25/60 |
| | | | 188/269 |
| 2015/0377678 A1* | 12/2015 | Edvardsson | G01S 13/88 |
| | | | 342/124 |
| 2020/0096378 A1* | 3/2020 | Westerling | G01S 7/025 |
| 2022/0205827 A1* | 6/2022 | Eriksson | G01S 13/227 |
| 2023/0204718 A1* | 6/2023 | Dubray | G01S 7/034 |
| | | | 342/118 |

* cited by examiner 2 pt

RADAR LEVEL GAUGE SYSTEM PROPAGATING MULTIPLE INDIVIDUALLY GENERATED TRANSMIT SIGNALS BY A COMMON ANTENNA

CROSS-REFERENCE TO RELATED APPLICATION

This application claims priority to European Patent Application No. 22209415.3, filed Nov. 24, 2022, the content of which is hereby incorporated by reference in its entirety.

TECHNICAL FIELD OF THE INVENTION

The present invention relates to a radar level gauge system comprising a first microwave unit and a second microwave unit.

TECHNICAL BACKGROUND

Reliable overfill prevention is important for safe operation of, for example, storage tanks. A widely used solution for overfill prevention is to provide each storage tank with one automatic tank gauging system and one separate level sensor for separately detecting an overfill condition. The automatic tank gauging system may typically include a radar level gauge system, that determines the distance to the surface of the product in the tank based on a timing relation between an electromagnetic transmit signal propagated towards the surface, and an electromagnetic reflection signal resulting from reflection of the transmit signal at the surface of the product.

For further improved safety, it is an industry trend to provide the separate level sensor as a separate automatic tank gauging system. This provides the benefit of being able to redundantly track the filling level, and to increase the capabilities of identifying possible malfunction of one of the separate systems.

U.S. Pat. No. 6,414,625 describes a convenient way of providing a plurality of functionally separated and independent radar measurement channels using a single antenna, and consequently a single opening in the tank wall. Such a system may be useful for providing reliable overfill prevention, but also for other applications where it may be desirable to provide several functionally independent radar-based level gauges.

There is a recent trend towards the use of high-frequency non-contact radar level gauge systems, having a carrier frequency of at least 60 GHZ, such as around 80 GHZ. High-frequency non-contact radar level gauge measurement provides several advantages over conventional non-contact radar level gauge systems with lower frequencies, such as around 26 GHz or less. Examples of such advantages may include a narrower measurement beam and more compact dimensions.

It would be desirable to be able to provide a robust and compact solution for several functionally independent radar-based level gauges sharing the same antenna also for higher carrier frequencies, such as 60 GHZ or higher.

SUMMARY

In view of the above, a general object of the present invention is to provide an improved radar level gauge system, in particular a radar level gauge system enabling independently generated high-frequency signals sharing the same antenna.

According to an aspect of the present invention, it is therefore provided a radar level gauge system, for gauging a level of a product in a tank, the radar level gauge system comprising: a first microwave unit including: a microwave transceiver; a transmitter patch coupled to the microwave transceiver for transmitting a first transmit signal; a receiver patch for receiving a first reflection signal resulting from reflection of the first transmit signal at a surface of the product in the tank; and processing circuitry coupled to the microwave transceiver for determining a first measure indicative of the level of the product based on a timing relation between the first transmit signal and the first reflection signal; a second microwave unit including: a microwave transceiver; a transmitter patch coupled to the microwave transceiver for transmitting a second transmit signal; a receiver patch for receiving a second reflection signal resulting from reflection of the second transmit signal at the surface of the product in the tank; and processing circuitry coupled to the microwave transceiver for determining a second measure indicative of the level of the product based on a timing relation between the second transmit signal and the second reflection signal; an antenna for radiating the first transmit signal and the second transmit signal towards the surface of the product, and for receiving the first reflection signal and the second reflection signal; and a signal coupling arrangement connecting the first microwave unit and the second microwave unit with the antenna, the signal coupling arrangement including: a first hollow waveguide directional coupler having a first waveguide section with a first end coupled to one of the transmitter patch and the receiver patch of the first microwave unit, and a second waveguide section with a first end coupled to the other one of the transmitter patch and the receiver patch of the first microwave unit; a second hollow waveguide directional coupler having a first waveguide section with a first end coupled to one of the transmitter patch and the receiver patch of the second microwave unit, and a second waveguide section with a first end coupled to the other one of the transmitter patch and the receiver patch of the second microwave unit; and a signal combiner coupled to a second end of the first waveguide section of the first hollow waveguide directional coupler, to a second end of the first waveguide section of the second hollow waveguide directional coupler, and to the antenna, the signal combiner being configured to provide the first transmit signal received from the first hollow waveguide directional coupler and the second transmit signal received from second hollow waveguide directional coupler to the antenna, and to provide the first reflection signal and the second reflection signal to the first and second hollow waveguide directional couplers.

The present invention is based on the realization that the use of separate transmitter and receiver patches in the microwave units, and hollow waveguide directional couplers in the signal coupling arrangement allows a robust and compact configuration with high sensitivity, which in turn provides for, for example, reliable overfill prevention.

To instead provide a single input/output in each microwave unit would allow a simpler configuration of the signal coupling arrangement, but would come at a significant sensitivity penalty. Simulations indicate that such a configuration would result in additional signal loss of approximately 4 dB.

In summary, the present invention thus relates to a radar level gauge system comprising a first microwave unit including a transmitter patch for transmitting a first transmit signal, a receiver patch for receiving a first reflection signal, and processing circuitry for determining a first level measurement; a second microwave unit including a transmitter patch for transmitting a second transmit signal, a receiver patch for receiving a second reflection signal, and processing circuitry for determining a second level measurement; an antenna; and a signal coupling arrangement including a first hollow waveguide directional coupler, a second hollow waveguide directional coupler, and a signal combiner.

BRIEF DESCRIPTION OF THE DRAWINGS

These and other aspects of the present invention will now be described in more detail, with reference to the appended drawings showing at least one embodiment of the invention, wherein.

DETAILED DESCRIPTION OF EXAMPLE EMBODIMENTS OF THE INVENTION

Figure 1:
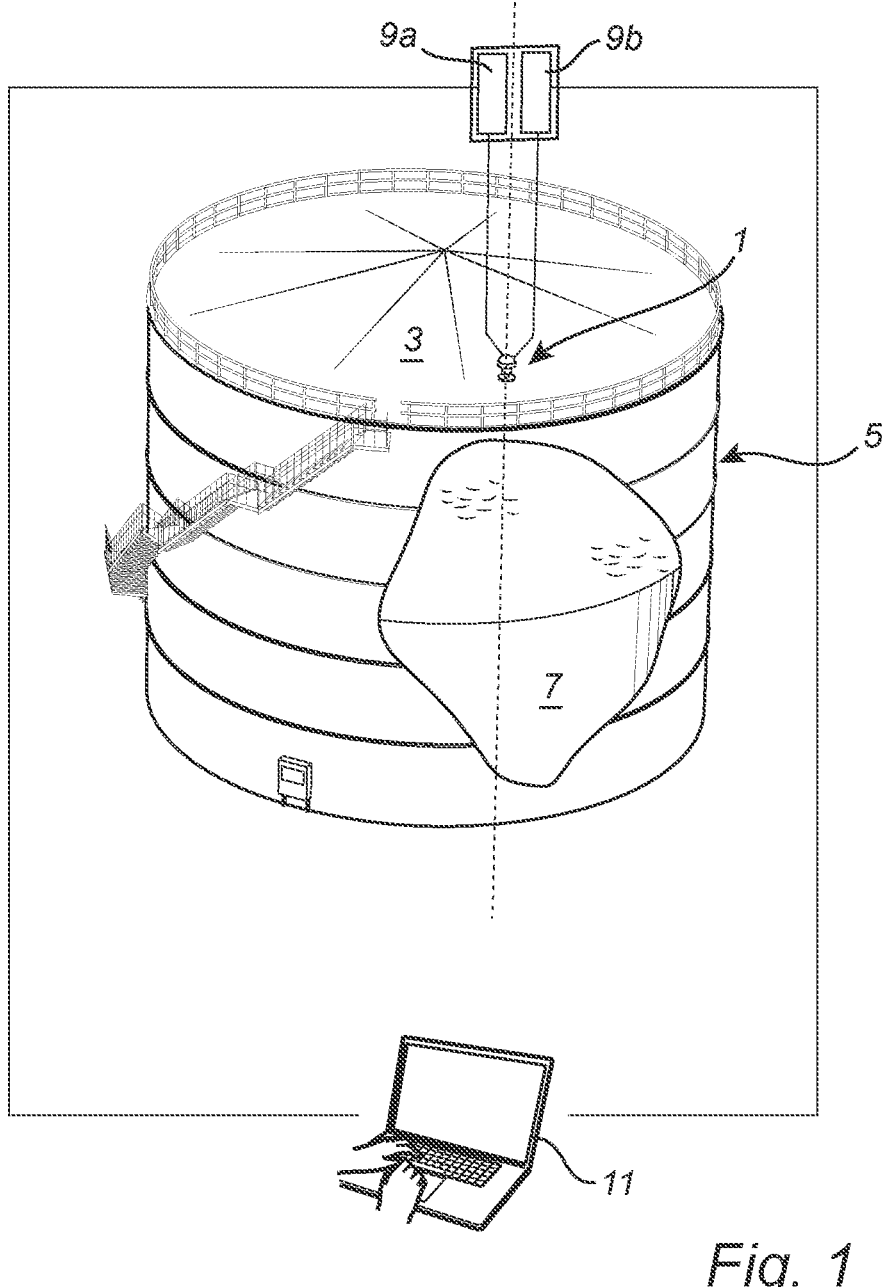
FIG. 1 schematically shows an example application of the radar level gauge system according to embodiments of the present invention.

FIG. 1 schematically shows an example application of the radar level gauge system 1 according to embodiments of the present invention. In FIG. 1, the radar level gauge system 1 is arranged at the roof 3 of a tank 5. The tank 5 contains a product 7. The radar level gauge system 1 in FIG. 1 is a so-called 2-in-1 radar level gauge system, by means of which the level of the product 7 can be monitored by two functionally independent radar level gauges sharing the same antenna. This configuration provides for redundant level gauging through a single opening in the roof 3 of the tank 5, which does not have to be bigger than the opening used for a regular radar level gauge system. The radar level gauge system 1 according to embodiments of the present invention, provides this 2-in-1 functionality using a high-frequency non-contact setup, with carrier frequencies of at least 60 GHZ, such as around 80 GHZ, with high sensitivity. The use of this high-frequency non-contact setup requires a smaller antenna than conventional non-contact radar level gauge systems, which allows the use of a smaller opening in the roof 3 of the tank 5. Furthermore, the higher frequency results in a narrower measurement beam, making the level gauging less sensitive to interference from fixed structures that may be present inside the tank 5, etc.

In FIG. 1, the 2-in-1 functionality is schematically indicated by the schematic separate measurement channels 9a-b, and the dashed line between them to emphasize the functional independence of the measurement channels 9a-b. Gauging data can be independently acquired from the each of the separate measurement channels 9a-b by an operator device 11, exemplified by the laptop in FIG. 1. The gauging data from the respective measurement channels 9a-b may be the same or different depending on the particular configurations of the measurement channels 9a-b. For instance, both of the measurement channels may continuously provide level data (for example intermittently with a suitable time period between consecutive level measurements), or one of the measurement channels may continuously provide level data, and the other one of the measurement channels may function as an overfill (or underfill) alarm, and only provide signals when the level of the product 7 is determined to become higher than a predefined overfill limit, and/or become lower than a predefined underfill limit.

Figure 2:
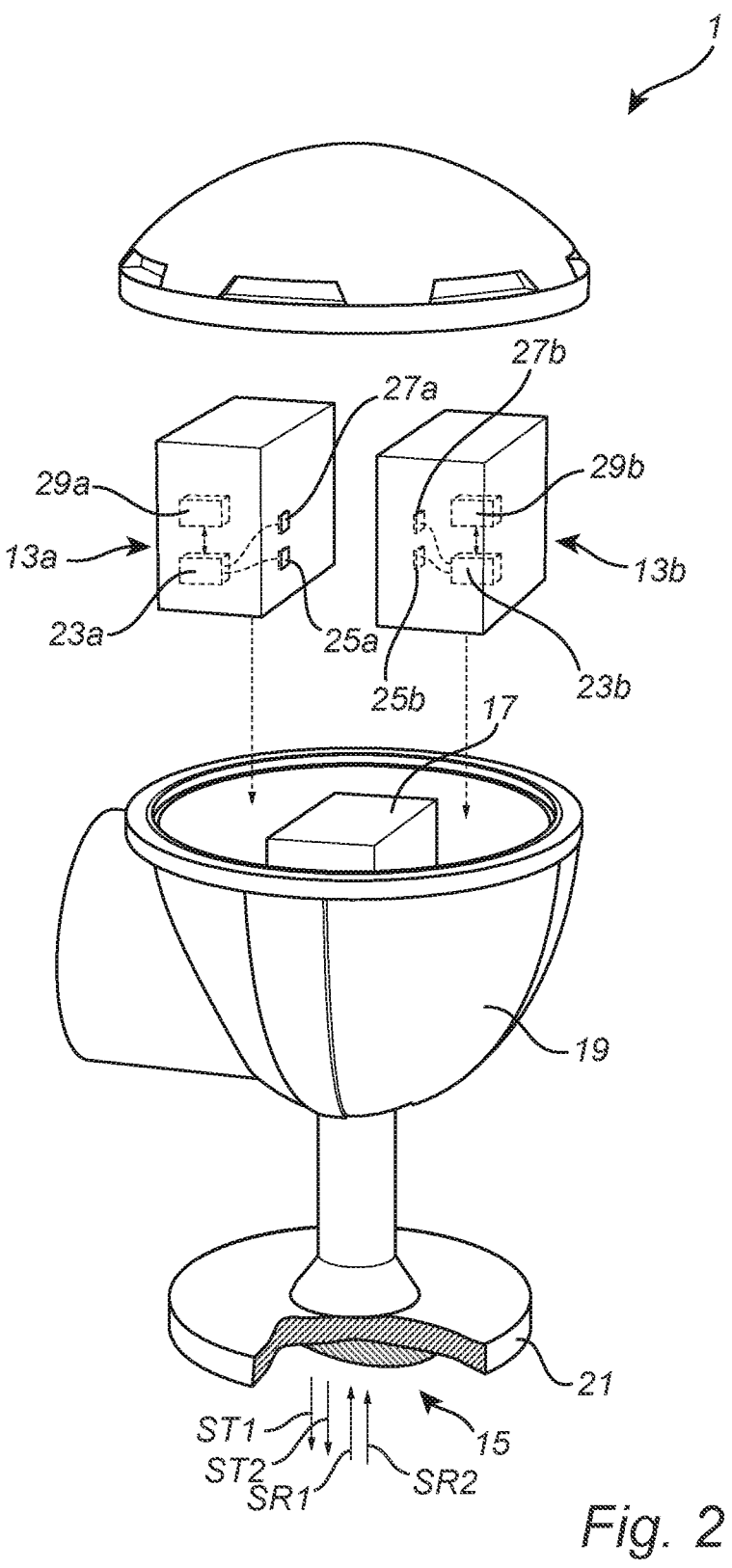
FIG. 2 is a conceptual illustration of the 2-in-1 radar level gauge system in FIG. 1, illustrating the compactness of the system.

FIG. 2 is a conceptual illustration of the 2-in-1 radar level gauge system 1 in FIG. 1, illustrating the compactness of the system. Referring to FIG. 2, the radar level gauge system 1 comprises a first microwave unit 13a, a second microwave unit 13b, an antenna 15, and a signal coupling arrangement 17 connecting the first microwave unit 13a and the second microwave unit 13b with the antenna 15. The first 13a and second 13b microwave units and the signal coupling arrangement 17 are arranged inside a housing 19, the antenna 15 may advantageously be a dielectric lens antenna, and the radar level gauge system 1 may be attached to the roof 3 of the tank 5 using a fastening arrangement, such as the exemplary flange 21 indicated in FIG. 2.

As is schematically indicated in FIG. 2, the first microwave unit 13a comprises a microwave transceiver 23a, a transmitter patch 25a, a receiver patch 27a, and processing circuitry 29a. The transmitter patch 25a is coupled to the microwave transceiver 23a and is configured to transmit a first transmit signal ST1, and the receiver patch 27a is configured to receive a first reflection signal SR1 resulting from reflection of the first transmit signal ST1 at a surface of the product 7. The processing circuitry 29a is coupled to the microwave transceiver 23a, and is configured to determine a first measure indicative of the level of the product 7 based on a timing relation between the first transmit signal ST1 and the first reflection signal SR1.

Analogously, the second microwave unit 13b comprises a microwave transceiver 23b, a transmitter patch 25b, a receiver patch 27b, and processing circuitry 29b. The transmitter patch 25b is coupled to the microwave transceiver 23b and is configured to transmit a second transmit signal ST2, and the receiver patch 27b is configured to receive a second reflection signal SR2 resulting from reflection of the second transmit signal ST2 at the surface of the product 7. The processing circuitry 29b is coupled to the microwave transceiver 23b, and is configured to determine a second measure indicative of the level of the product 7 based on a timing relation between the second transmit signal ST2 and the second reflection signal SR2. Each of the first transmit signal ST1 and the second transmit signal ST2 may advantageously have a center frequency higher than 60 GHz and lower than 90 GHz.

In this context, it should be noted that the "microwave transceiver" may be one functional unit capable of transmitting and receiving microwave signals, or may be a system comprising separate transmitter and receiver units. Furthermore, for all embodiments, it should be noted that the processing circuitry may be provided as one device or several devices working together.

Figure 3:
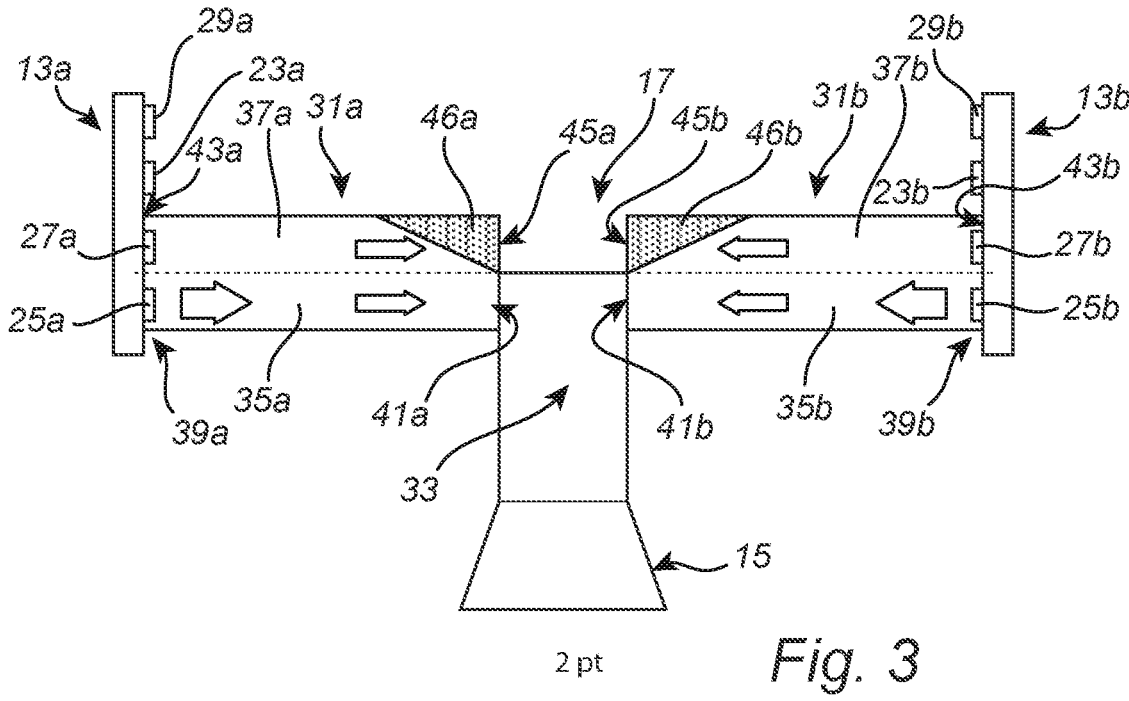
FIG. 3 is a functional illustration of a radar level gauge system according to embodiments of the present invention.

FIG. 3 is a functional illustration of a radar level gauge system 1 according to embodiments of the present invention, intended to aid in the description of the functionalities of the different parts of the radar level gauge system 1. In particular, FIG. 3 provides a schematic and functional illustration of the signal coupling arrangement 17 connecting the first microwave unit 13*a* and the second microwave unit 13*b* with the antenna 15.

Referring to FIG. 3, the signal coupling arrangement 17 comprises a first hollow waveguide directional coupler 31*a*, a second hollow waveguide directional coupler 31*b*, and a signal combiner 33. The first hollow waveguide directional coupler 31*a* includes a first waveguide section 35*a* and a second waveguide section 37*a*. The first waveguide section 35*a* has a first end 39*a* and a second end 41*a*, and the second waveguide section 37*a* has a first end 43*a* and a second end 45*a*. In FIG. 3, the first end 39*a* of the first waveguide section 35*a* is indicated as being coupled to the transmitter patch 25*a*, and the first end 43*a* of the second waveguide section 37*a* is indicated as being coupled to the receiver patch 27*a*. It should be noted that this is not essential to the functionality of the signal coupling arrangement 17, and that the transmitter patch 25*a* may equally well be coupled to the first end 43*a* of the second waveguide section 37*a*. The second hollow waveguide directional coupler 31*b* includes a first waveguide section 35*b* and a second waveguide section 37*b*. The first waveguide section 35*b* has a first end 39*b* and a second end 41*b*, and the second waveguide section 37*b* has a first end 43*b* and a second end 45*b*. In FIG. 3, the first end 39*b* of the first waveguide section 35*b* is indicated as being coupled to the transmitter patch 25*b*, and the first end 43*b* of the second waveguide section 37*b* is indicated as being coupled to the receiver patch 27*b*. It should be noted that this is not essential to the functionality of the signal coupling arrangement 17, and that the transmitter patch 25*b* may equally well be coupled to the first end 43*b* of the second waveguide section 37*b*.

With continued reference to FIG. 3, the signal combiner 33 is coupled to the second end 41*a* of the first waveguide section 35*a* of the first hollow waveguide directional coupler 31*a*, to the second end 41*b* of the first waveguide section 35*b* of the second hollow waveguide directional coupler 31*b*, and to the antenna 15. The signal combiner 33 is configured to provide the first transmit signal ST1 received from the first hollow waveguide directional coupler 31*a* and the second transmit signal ST2 received from second hollow waveguide directional coupler 31*b* to the antenna 15, and to provide the first reflection signal SR1 and the second reflection signal SR2 to the first 31*a* and second 31*b* hollow waveguide directional couplers, respectively.

As is schematically indicated in FIG. 3, the first hollow waveguide directional coupler 31*a* may be configured to provide, from the first end 39*a* of the waveguide section (here the first waveguide section 35*a*) that is coupled to the transmitter patch 25*a* of the first microwave unit 13*a*, substantially equal proportions of energy carried by the first transmit signal ST1 to the second end 41*a* of the first waveguide section 35*a* and the second end 45*a* of the second waveguide section 37*a*, and substantially prevent energy carried by the first transmit signal ST1 from being provided to the first end 43*a* of the waveguide section (here the second waveguide section 37*a*) that is coupled to the receiver patch 27*a* of the first microwave unit 13*a*. Analogously, the second hollow waveguide directional coupler 31*b* may be configured to provide, from the first end 39*b* of the waveguide section (here the first waveguide section 35*b*) that is coupled to the transmitter patch 25*b* of the second microwave unit 13*b*, substantially equal proportions of energy carried by the second transmit signal ST2 to the second end 41*b* of the first waveguide section 35*b* and the second end 45*b* of the second waveguide section 37*b*, and substantially prevent energy carried by the second transmit signal ST2 from being provided to the first end 43*b* of the waveguide section (here the second waveguide section 37*b*) that is coupled to the receiver patch 27*b* of the second microwave unit 13*b*. In FIG. 3, the energy carried by the first ST1 and second ST2 transmit signals, respectively, is indicated by block arrows with different widths.

The energy carried by the first transmit signal ST1 to the second end 41*a* of the first waveguide section 35*a* of the first hollow waveguide directional coupler 31*a* is provided to the signal combiner 33, as is schematically indicated in FIG. 3, while the energy carried by the first transmit signal ST1 by the second waveguide section 37*a* is not made use of. In the example configuration of FIG. 3, this energy is absorbed by an optional first microwave attenuator 46*a* provided at the second end 45*a* of the second waveguide section 37*a* of the first hollow waveguide directional coupler 31*a*. As is schematically indicated in FIG. 3, the first microwave attenuator 46*a* may be arranged inside the second waveguide section 37*a* of the first hollow waveguide directional coupler 31*a*, and configured to occupy a fraction of an area of a cross-section of the second waveguide section 37*a*, the fraction increasing with decreasing distance to the second end 445*a* of the second waveguide section 37*a*. The optional first attenuator 46*a* may be made of a microwave absorbing medium. In the same way as described above for the first hollow waveguide directional coupler 31*a*, the second hollow waveguide directional coupler 31*b* may be provided with an optional second attenuator 46*b*.

The first transmit signal ST1 and the second transmit signal ST2 may advantageously be mutually distinguishable. This may be achieved by various means, such as controlled timing. For true independent operation of the first and second measurement channels provided by the first 13*a* and second 13*b* microwave units, it may, however, be advantageous to make the first transmit signal ST1 and the second transmit signal ST2 mutually distinguishable by configuring the signal coupling arrangement 17 to provide the first transmit signal ST1 to the antenna 15 in a first polarization state and to provide the second transmit signal ST2 to the antenna 15 in a second polarization state, different from the first polarization state. The first and second polarization states may advantageously be different linear polarizations, such mutually orthogonal linear polarizations.

Figure 4:
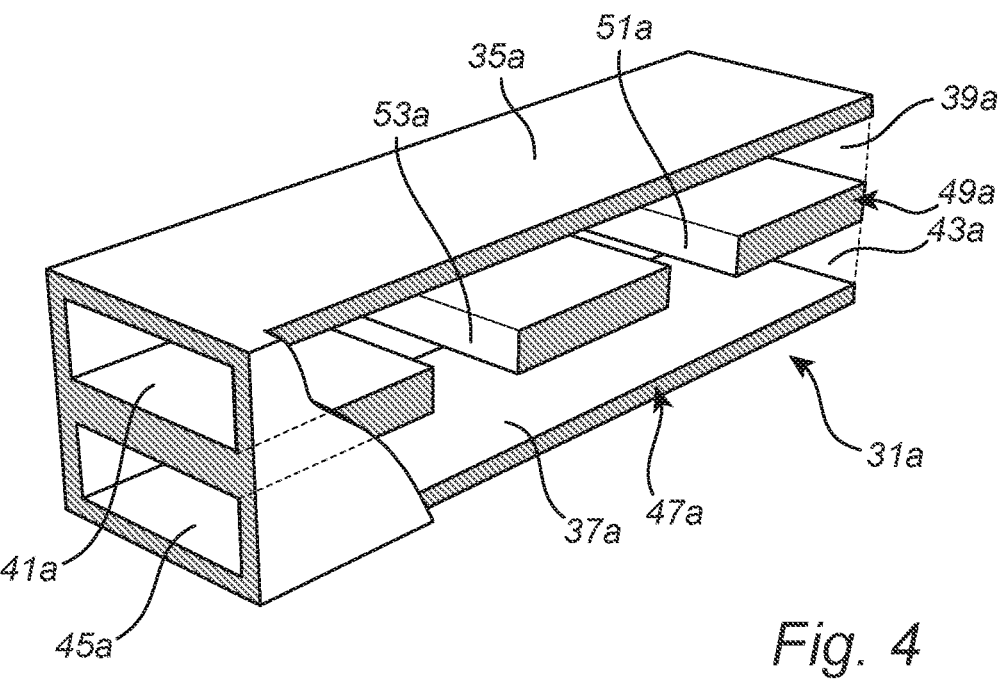
FIG. 4 is a schematic illustration of a hollow waveguide directional coupler that may be comprised in the radar level gauge system according to embodiments of the present invention.

As is, per se, known to those skilled in the relevant art, there are many different hollow waveguide directional coupler configurations that can provide the coupler properties detailed above with reference to FIG. 3. FIG. 4 is a schematic illustration of one example of a hollow waveguide directional coupler 31*a* that may be comprised in the radar level gauge system 1 according to embodiments of the present invention. Since the first hollow waveguide directional coupler 31*a* and the second hollow waveguide directional coupler 31*b* may have the same or similar configurations, only one hollow waveguide directional coupler (such as the first hollow waveguide directional coupler 31*a*) is described here.

Referring to FIG. 4, each of the first waveguide section 35*a* and the second waveguide section 37*a* is a hollow waveguide defined by an electrically conductive envelope 47*a* including a partially open wall 49*a* between the first waveguide section 35*a* and the second waveguide section 37*a*. Through the provision of the partially open wall 49*a*, the energy of the first transmit signal ST1 can be substantially equally distributed between the first 35*a* and second 37*a* waveguide sections, as described above with reference to FIG. 3. The most suitable configuration of the first 35*a* and second 37a waveguide sections and the partially open wall 49a for a given system design will be straight-forward for the skilled person to determine using, for example, commercially available microwave propagation simulation tools. In the example configuration in FIG. 4, there are two openings 51a and 53a in the partially open wall 49a, and a total length, in the signal propagation direction, of the openings corresponds to about one wavelength at the carrier frequency of the first transmit signal ST1. As an example of an alternative configuration, a single opening in the partially open wall 49a would also provide satisfactory performance.

In FIG. 4, the first waveguide section 35a and the second waveguide section 37a are indicated as having substantially rectangular cross-sections. Although this configuration of the waveguide sections may be beneficial in such aspects as signal propagation properties and manufacturability, it should be noted that the waveguide sections may have other configurations, such as elliptical. Of course, the term "rect-angular" also includes rectangular with rounded corners.

Figure 5:
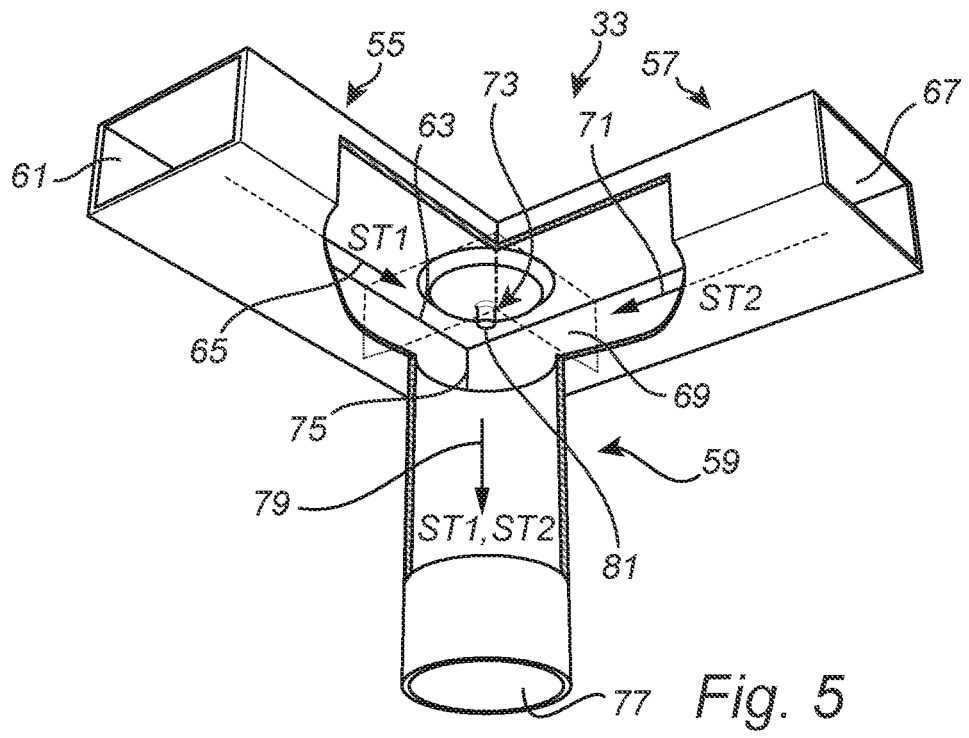
FIG. 5 is a schematic illustration of a signal combiner that may be comprised in the radar level gauge system according to embodiments of the present invention.

FIG. 5 is a schematic illustration of an exemplary signal combiner 33 that may be comprised in the radar level gauge system 1 according to embodiments of the present invention.

Referring to FIG. 5, the exemplary signal combiner 33 comprises a rectangular first combiner waveguide 55, a rectangular second combiner waveguide 57, and an elliptical third combiner waveguide 59 (in the example configuration in FIG. 5, the third combiner waveguide 59 is circular). The first combiner waveguide 55 has a first end 61 and a second end 63. Although this is not explicitly shown in FIG. 5, in the signal coupling arrangement 17 (additional references to FIG. 3), the first end 61 of the first combiner waveguide 55 is coupled to the second end 41a of the first waveguide section 35a of the first hollow waveguide directional coupler 31a to receive the first transmit signal ST1. The first combiner waveguide 55 is configured to guide the first transmit signal ST1 along a first propagation path 65. The second combiner waveguide 57 has a first end 67 and a second end 69. Although this is not explicitly shown in FIG. 5, in the signal coupling arrangement 17 (additional references to FIG. 3), the first end 67 of the second combiner waveguide 57 is coupled to the second end 41b of the first waveguide section 35b of the second hollow waveguide directional coupler 31b to receive the second transmit signal ST2. The second combiner waveguide 57 is configured to guide the second transmit signal ST2 along a second propagation path 71 such that the first transmit signal ST1 and the second transmit signal ST2 meet orthogonally at a transmit signal meeting location 73. The third combiner waveguide 59 has a first end 75 coupled to the second end 63 of the first combiner waveguide 55 and to the second end 69 of the second combiner waveguide 57, and a second end 77. The third combiner waveguide 59 is configured to guide the first transmit signal ST1 and the second transmit signal ST2 along a third propagation path 79 being orthogonal to the first propagation path 65 and the second propagation path 71. As is indicated in FIG. 5, the signal combiner 33 further comprises a metallic member 81 arranged at the transmit signal meeting location 73, and configured to redirect the first transmit signal ST1 and the second transmit signal ST2 to the third propagation path 79.

With the above-described configuration of the signal combiner 33, which can be seen as a variation of a so-called "turnstile junction combiner", the first transmit signal ST1 and the second transmit signal ST2 can be combined without leakage from the first combiner waveguide 55 to the second combiner waveguide 57, and vice versa. This is due to the linear polarizations of the first transmit signal ST1 and the second transmit signal ST2, and the first ST1 and second ST2 transmit signals meeting each other orthogonally (in terms of signal propagation direction). The metallic member 81 may be a protrusion extending from a wall of the signal combiner 33 opposite the third combiner waveguide at the transmit signal meeting location 73.

It should be noted that, although the signal combiner 33 described above with reference to FIG. 5 has advantageous properties, other signal combiner configurations may also be suitable for the radar level gauge system 1 according to embodiments of the present invention. Examples of such other signal combiner configurations may include so-called orthomode transducers.

Figure 6:
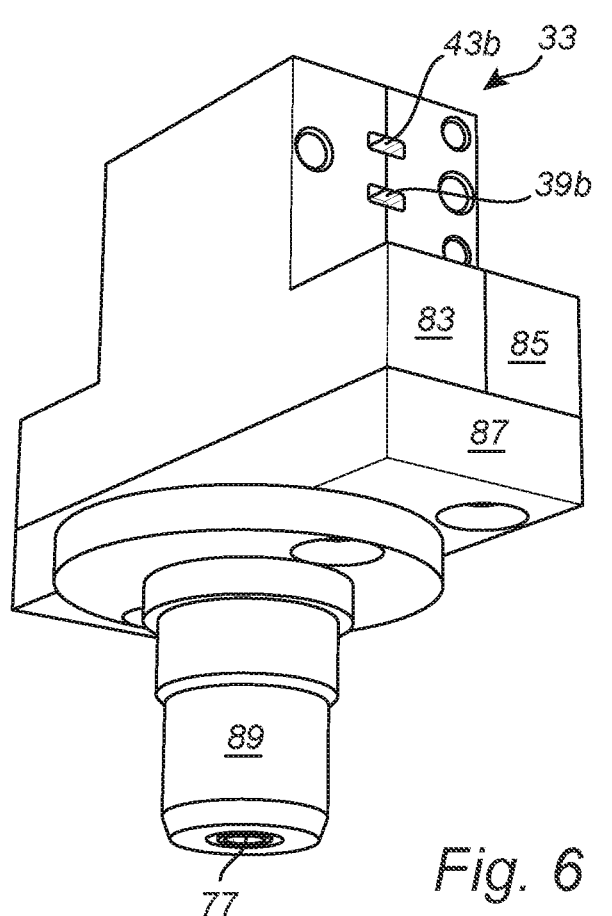
FIG. 6 is a schematic illustration of a signal coupling arrangement configuration that may be comprised in the radar level gauge system according to embodiments of the present invention.

FIG. 6 is a schematic illustration of an exemplary signal coupling arrangement configuration that may be comprised in the radar level gauge system 1 according to embodiments of the present invention. In FIG. 6, which is a perspective view of the signal coupling arrangement 17 in its assembled state, the first end 39b of the first waveguide section 35b and the first end 43b of the second waveguide section 37b of the second hollow waveguide directional coupler 31b, as well as the second end 77 of the third combiner waveguide 59 of the signal combiner 33, are visible. In the configuration of the signal coupling arrangement 17 shown in FIG. 6, the signal coupling arrangement 17 is formed by first metallic part 83, a second metallic part 85, a third metallic part 87, and a fourth metallic part 89 joined together.

Figures 7A, 7B:
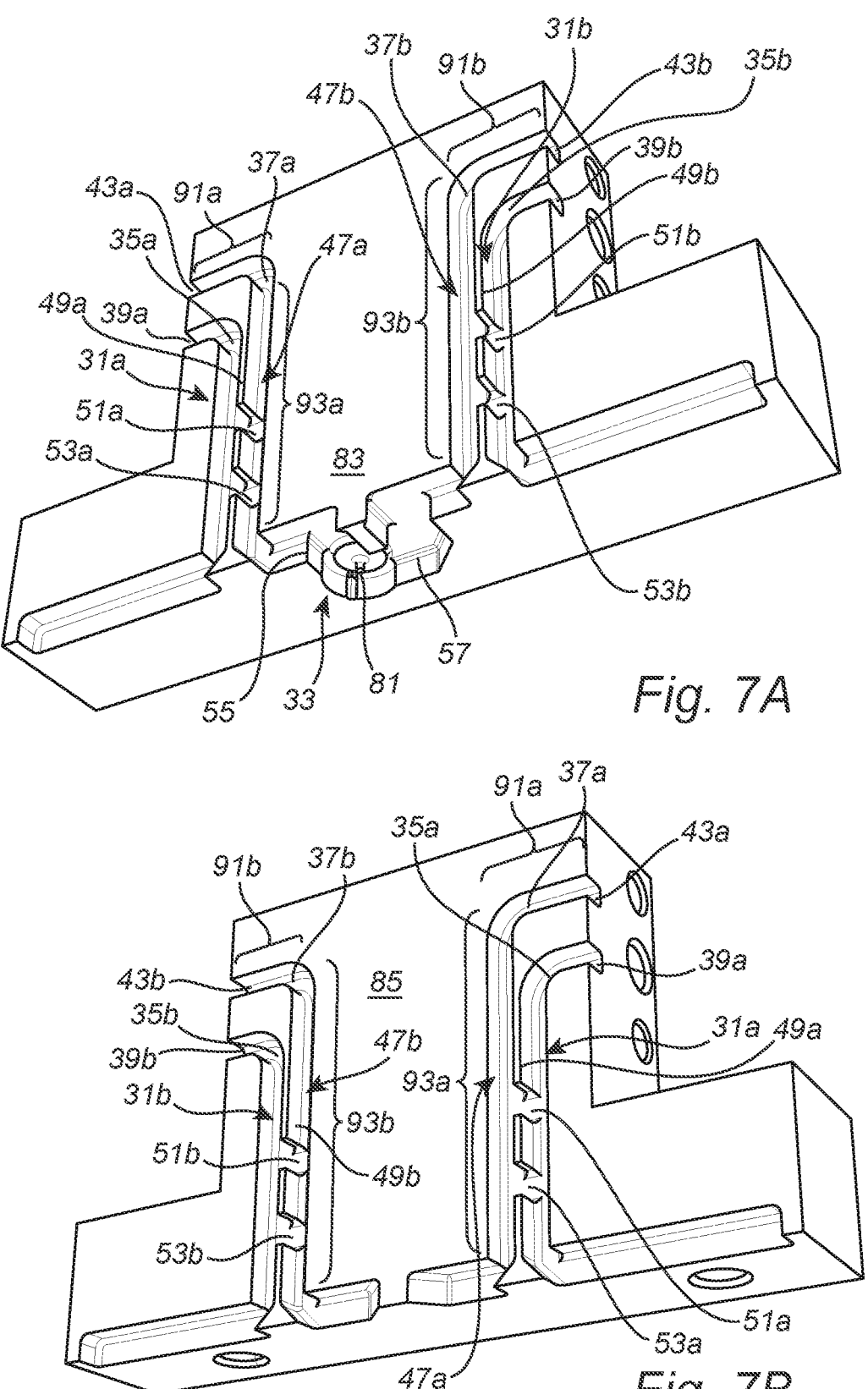
FIGS. 7A-D are perspective illustrations of parts of the signal coupling arrangement configuration in FIG. 6.
Figure 7C:
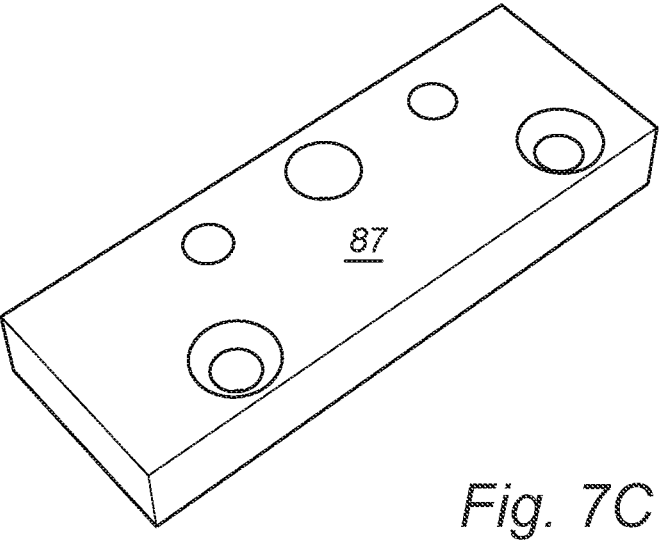
Figure 7D:
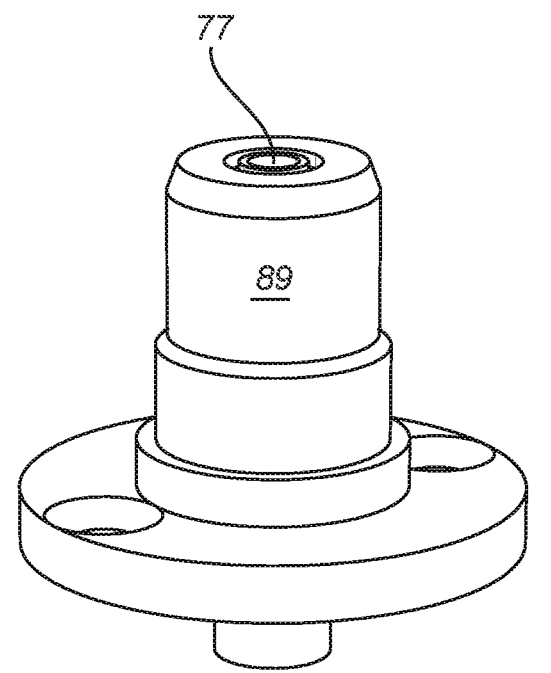

FIGS. 7A-D are perspective illustrations of parts of the signal coupling arrangement 17 in FIG. 6. FIG. 7A shows the first metallic part 83, FIG. 7B shows the second metallic part 85, FIG. 7C shows the third metallic part 87, and FIG. 7D shows the fourth metallic part 89.

As can be seen in FIGS. 7A and 7B, the first metallic part 83, which may be referred to as a first signal coupling arrangement part, and the second metallic part 85, which may be referred to as a second signal coupling arrangement part, can be joined together to form the first hollow wave-guide directional coupler 31a and the second hollow wave-guide directional coupler 31b. The first metallic part 83 and the second metallic part 85 may advantageously be formed by milling. The outline of the signal combiner 33 is formed in the first metallic part, and the formation of the signal combiner 33 is achieved by adding the third metallic part 87 and the fourth metallic part 89 to the first 83 and second 85 metallic parts joined together. It should be noted that it is not necessary to form the various metallic parts described herein as single pieces, but that, for example, the first 31a and second 31b hollow waveguide directional couplers can be formed by separate pairs of metallic parts.

Referring to FIGS. 7A and 7B, it can be seen that each of the first waveguide section 35a and the second waveguide section 37a of the first hollow waveguide directional coupler 31a has a first portion 91a, starting at the first end thereof, extending in a first direction, and a second portion 93a extending in a second direction, different from the first direction, and each of the first waveguide section 35b and the second waveguide section 37b of the second hollow waveguide directional coupler 31b has a first portion 91b, starting at the first end thereof, extending in a third direction, and a second portion 93b extending in a fourth direction, different from the third direction. This configuration allows a more compact configuration of the radar level gauge system 1, as is schematically indicated in FIG. 2. The first direction may be substantially opposite the third direction; and the second direction may be substantially the same as the fourth direction.

The person skilled in the art realizes that the present invention by no means is limited to the preferred embodiments described above. On the contrary, many modifications and variations are possible within the scope of the appended claims.

What is claimed is:

1. A radar level gauge system, for gauging a level of a product in a tank, the radar level gauge system comprising:
   a first microwave unit including:
      a microwave transceiver;
      a transmitter patch coupled to the microwave transceiver for transmitting a first transmit signal;
      a receiver patch for receiving a first reflection signal resulting from reflection of the first transmit signal at a surface of the product in the tank; and
      processing circuitry coupled to the microwave transceiver for determining a first measure indicative of the level of the product based on a timing relation between the first transmit signal and the first reflection signal;
   a second microwave unit including:
      a microwave transceiver;
      a transmitter patch coupled to the microwave transceiver for transmitting a second transmit signal;
      a receiver patch for receiving a second reflection signal resulting from reflection of the second transmit signal at the surface of the product in the tank; and
      processing circuitry coupled to the microwave transceiver for determining a second measure indicative of the level of the product based on a timing relation between the second transmit signal and the second reflection signal;
   an antenna for radiating the first transmit signal and the second transmit signal towards the surface of the product, and for receiving the first reflection signal and the second reflection signal; and
   a signal coupling arrangement connecting the first microwave unit and the second microwave unit with the antenna, the signal coupling arrangement including:
      a first hollow waveguide directional coupler having a first waveguide section with a first end coupled to one of the transmitter patch and the receiver patch of the first microwave unit, and a second waveguide section with a first end coupled to the other one of the transmitter patch and the receiver patch of the first microwave unit;
      a second hollow waveguide directional coupler having a first waveguide section with a first end coupled to one of the transmitter patch and the receiver patch of the second microwave unit, and a second waveguide section with a first end coupled to the other one of the transmitter patch and the receiver patch of the second microwave unit; and
      a signal combiner coupled to a second end of the first waveguide section of the first hollow waveguide directional coupler, to a second end of the first waveguide section of the second hollow waveguide directional coupler, and to the antenna,
      the signal combiner being configured to provide the first transmit signal received from the first hollow waveguide directional coupler and the second transmit signal received from the second hollow waveguide directional coupler to the antenna, and to provide the first reflection signal and the second reflection signal to the first and second hollow waveguide directional couplers, respectively.

2. The radar level gauge system according to claim 1, wherein the first hollow waveguide directional coupler is configured to:
   provide, from the first end of the waveguide section that is coupled to the transmitter patch of the first microwave unit, substantially equal proportions of energy carried by the first transmit signal to the second end of the first waveguide section and the second end of the second waveguide section; and
   substantially prevent energy carried by the first transmit signal from being provided to the first end of the waveguide section that is coupled to the receiver patch of the first microwave unit; and
wherein the second hollow waveguide directional coupler is configured to:
   provide, from the first end of the waveguide section that is coupled to the transmitter patch of the second microwave unit, substantially equal proportions of energy carried by the first transmit signal to the second end of the first waveguide section and the second end of the second waveguide section; and
   substantially prevent energy carried by the second transmit signal from being provided to the first end of the waveguide section that is coupled to the receiver patch of the second microwave unit.

3. The radar level gauge system according to claim 1, wherein:
   each of the first waveguide section and the second waveguide section of the first hollow waveguide directional coupler is a hollow waveguide defined by an electrically conductive envelope including a partially open wall between the first waveguide section and the second waveguide section; and
   each of the first waveguide section and the second waveguide section of the second hollow waveguide directional coupler is a hollow waveguide defined by an electrically conductive envelope including a partially open wall between the first waveguide section and the second waveguide section.

4. The radar level gauge system according to claim 3, wherein the electrically conductive envelope defining the first hollow waveguide directional coupler and the electrically conductive envelope defining the second hollow waveguide directional coupler are formed by a first metallic part and a second metallic part joined together.

5. The radar level gauge system according to claim 4, wherein the signal combiner is formed by the first metallic part and a third metallic part joined to the first metallic part.

6. The radar level gauge system according to claim 1, wherein:
   each of the first waveguide section and the second waveguide section of the first hollow waveguide directional coupler has a substantially rectangular cross-section; and
   each of the first waveguide section and the second waveguide section of the second hollow waveguide directional coupler has a substantially rectangular cross-section.

7. The radar level gauge system according to claim 1, wherein the signal combiner comprises:
   a rectangular first combiner waveguide having a first end coupled to the second end of the first waveguide section of the first hollow waveguide directional coupler and a second end, the first combiner waveguide being configured to guide the first transmit signal along a first propagation path;
   a rectangular second combiner waveguide having a first end coupled to the second end of the first waveguide section of the second hollow waveguide directional coupler and a second end, the second combiner waveguide being configured to guide the second transmit signal along a second propagation path such that the first transmit signal and the second transmit signal meet orthogonally at a transmit signal meeting location;

an elliptical third combiner waveguide having a first end coupled to the second end of the first combiner waveguide and to the second end of the second combiner waveguide, and a second end coupled to the antenna, the third combiner waveguide being configured to guide the first transmit signal and the second transmit signal along a third propagation path being orthogonal to the first propagation path and the second propagation path; and a metallic member arranged at the transmit signal meeting location, and configured to redirect the first transmit signal and the second transmit signal to the third propagation path.

8. The radar level gauge system according to claim 1, wherein:

each of the first waveguide section and the second waveguide section of the first hollow waveguide directional coupler has a first portion, starting at the first end thereof, extending in a first direction, and a second portion extending in a second direction, different from the first direction; and each of the first waveguide section and the second waveguide section of the second hollow waveguide directional coupler has a first portion, starting at the first end thereof, extending in a third direction, and a second portion extending in a fourth direction, different from the third direction.

9. The radar level gauge system according to claim 8, wherein:

the first direction is substantially opposite the third direction; and the second direction is substantially the same as the fourth direction.

10. The radar level gauge system according to claim 1, wherein:

a first microwave attenuator is provided at the second end of the second waveguide section of the first hollow waveguide directional coupler; and a second microwave attenuator is provided at the second end of the second waveguide section of the second hollow waveguide directional coupler.

11. The radar level gauge system according to claim 10, wherein:

the first microwave attenuator is arranged inside the second waveguide section of the first hollow waveguide directional coupler and configured to occupy a fraction of an area of a cross-section of the second waveguide section, the fraction increasing with decreasing distance to the second end of the second waveguide section; and the second microwave attenuator is arranged inside the second waveguide section of the second hollow waveguide directional coupler and configured to occupy a fraction of an area of a cross-section of the second waveguide section, the fraction increasing with decreasing distance to the second end of the second waveguide section.

12. The radar level gauge system according to claim 1, wherein the first transmit signal and the second transmit signal are mutually distinguishable.

13. The radar level gauge system according to claim 12, wherein the signal coupling arrangement is configured to provide the first transmit signal to the antenna in a first polarization state and to provide the second transmit signal to the antenna in a second polarization state, different from the first polarization state.

14. The radar level gauge system according to claim 1, wherein each of the first transmit signal and the second transmit signal has a center frequency higher than 60 GHz and lower than 90 GHz.

* * * * *